G. F. BRENT.
SPRING REINFORCEMENT.
APPLICATION FILED JAN. 13, 1919.
1,311,751. Patented July 29, 1919.
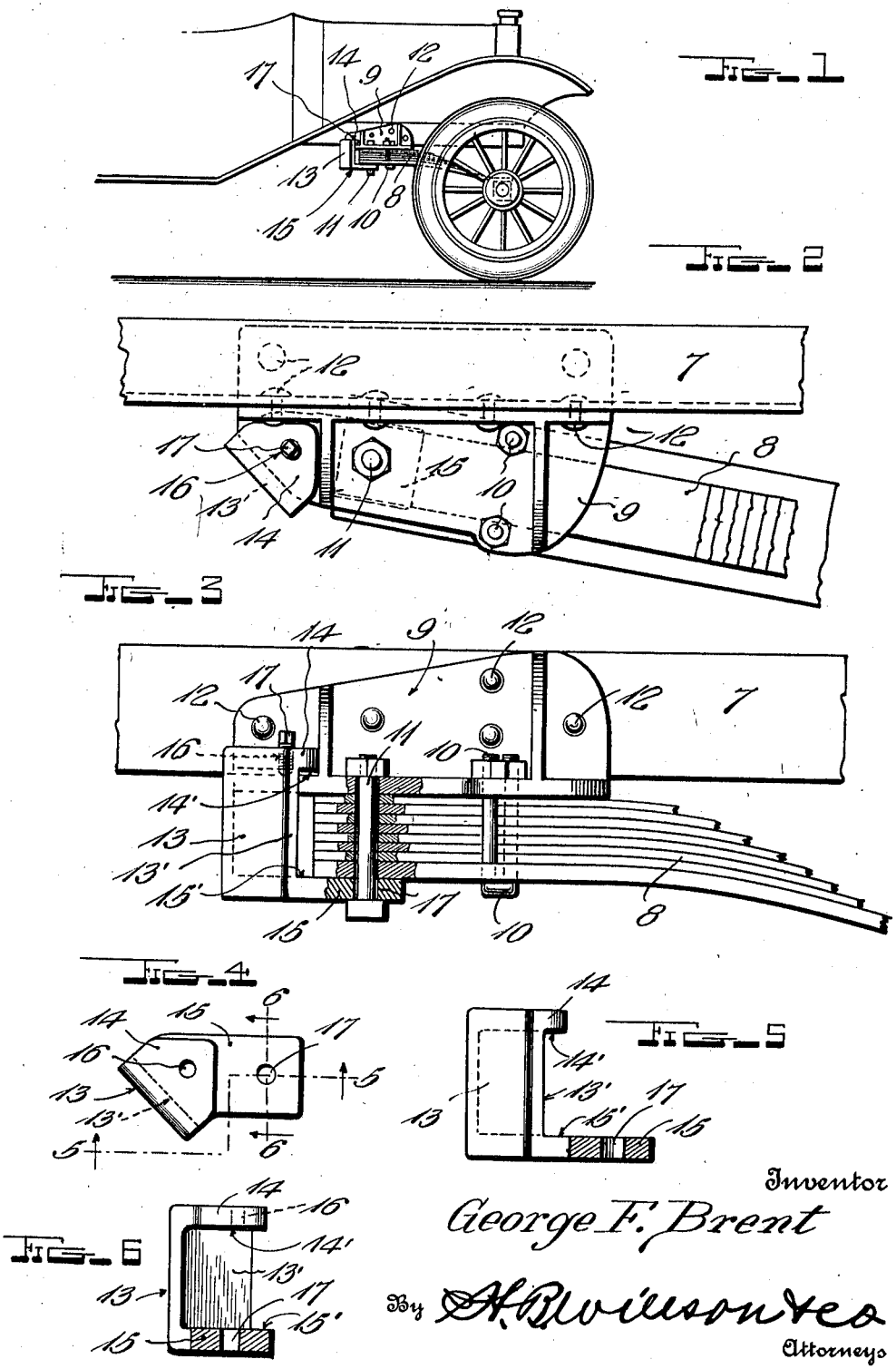
Inventor
George F. Brent
By H. B. Willson &co.
Attorneys

UNITED STATES PATENT OFFICE.

GEORGE F. BRENT, OF WEISER, IDAHO.

SPRING REINFORCEMENT.

1,311,751. Specification of Letters Patent. Patented July 29, 1919.

Application filed January 13, 1919. Serial No. 270,920.

*To all whom it may concern:*

Be it known that I, GEORGE F. BRENT, a citizen of the United States, residing at Weiser, in the county of Washington and State of Idaho, have invented certain new and useful Improvements in Spring Reinforcements; and I do declare the following to be a full, clear, and exact description of the invention, such as will enable others skilled in the art to which it appertains to make and use the same.

This invention relates to automobile accessories and it relates more particularly to an attachment for reinforcing a spring-connection of a Chevrolet automobile or other similar vehicle.

One object of this invention is to provide a simple, strong and convenient attachment to reinforce the bolts that connect the chassis-supporting springs to the chassis.

Another object is to provide a device of this character which consists of few and simple parts, and may be manufactured at a comparatively slight cost.

Other objects and advantages may become apparent to persons who read the following details of description in connection with the accompanying drawings in which:—

Figure 1 is a side elevation of the front portion of an automobile having my improved reinforcing or spring-securing device attached thereto.

Fig. 2 is a top plan view of a part of the chassis, spring and spring-bracket of the automobile and of my improved reinforcing attachment or connection secured thereto.

Fig. 3 is a side elevation, partly in section, of the mechanism shown in Fig. 2.

Fig. 4 is a top plan view of the main member of my spring connecting device in its entirety, the set screw being omitted.

Fig. 5 is a view, partly in side elevation and partly in section, of the member shown in Fig. 4, the section being taken along the line 5—5 of Fig. 4; and, Fig. 6 is a view similar to Fig. 5 except that the section is taken along the line 6—6 of Fig. 4.

Referring to these drawings in detail, in which similar reference characters correspond with similar parts throughout the several views, the automobile chassis is indicated by the numeral 7, the adjacent spring 8 being secured thereto by means of a bracket 9, a U-bolt 10, a vertical bolt 11, and rivets 12, the latter securing the bracket to the chassis member 7 in a manner well known to persons who are acquainted with the Chevrolet automobiles. The parts thus far described are simply introductory, and will not be claimed *per se* as a part of my invention. It has been the experience of some users of this machine that the sidewise movements of the chassis sometimes effects a greater or less swinging movement of the bolts 10 and 11, especially the latter, and after the machine has been used awhile, the nut on the bolt 11 is likely to become loosened, thus allowing a greater amount of swing to the lower end of this bolt, which throws a greater strain on the U-bolt 10 until one or both of the bolts 10 and 11 is likely to break, which, of course, may result in a serious accident. Now, in order to prevent this swinging movement of the lower end of the bolt 11, I provide my improved spring securing attachment which is shown separated in Figs. 4, 5 and 6, and a detailed description of this device will now be given as follows.

Although this device may be formed in any desired and appropriate way, I preferably form the same from a blank of heavy sheet metal, and bend the same into the shape shown in Figs. 4, 5 and 6. In other words, this device is formed with a plate 13, a short flange 14 and an end flange 15, the flanges 14 and 15 being in spaced and parallel relation to one another, and their opposing surfaces 14' and 15' being disposed at right angles to the inner surface 13' of the plate 13, this inner surface 13' being preferably plane and normally vertical.

The free end portion of the flange 14 is preferably triangular, the base of the triangle being parallel with the plane surface 13', and this triangular portion is provided with a screw-threaded aperture 16 into which a set screw 17 is fitted.

The relatively long flange 15 has each of its longitudinal edges disposed at an acute angle to the plane surface 13'. Adjacent to the rear end of the relatively long flange 15 is provided an aperture 17 to receive the lower end of the bolt 11, and when the bolt is seated in the aperture 17, the upper plane surface of the securing device is fitted tight against the lower plane surface of the lower one of the superposed spring leaves which compose the spring 8, it being understood that the butt end portions of the spring leaves are apertured to receive the bolt 11, and that, if necessary, a somewhat longer bolt may be substituted for the one ordinarily used. The triangular end of the relatively short flange is fitted in the angular space which is formed in the bracket 9 being on the upper end of the bolt 11, as indicated in Figs. 2 and 3, and the set screw 17 is tightened against the horizontal plate against which the upper spring leaf rests. It will be readily understood that any tendency of the spring 8 to swing the head of the bolt 17 laterally of the chassis will be resisted by the clamping action of my improved spring securing device.

Although I have described this embodiment of my invention very specifically, it is not intended to limit this invention to these exact details of construction and arrangement of parts, but I am entitled to make changes within the scope of the inventive idea disclosed in the foregoing description and following claims.

What I claim as my invention is:

1. A securing device comprising a yoke formed with two spaced parallel flanges and a plate united with the flanges and having a plane surface adjoining the parallel opposing surfaces of the flanges and being at right angles to said opposing surfaces, one of said flanges being relatively short and having a triangular apertured and screw-threaded end, the base of the triangle being substantially parallel with the said plane surface, the other flange being relatively long and having its longitudinal edges disposed at an acute angle to said plane surface, said relatively long flange having an aperture therethrough to receive a bolt or the like, and a set screw in the aperture of said relatively short flange.

2. The combination with the superposed butt ends of chassis-supporting spring leaves and connecting bracket and bolt of an automobile, of a yoke formed with two spaced parallel flanges and a plate united with these flanges and having a plane surface adjoining the opposing parallel surfaces of the flanges and disposed at right angles thereto, one of said flanges being relatively long and having its longitudinal edges disposed at an acute angle to said plane surface, the free end of said relatively long flange having an aperture therethrough to receive the lower end of said bolt, the other flange being relatively short and having a threaded aperture therethrough, and a set screw in said aperture and engaging with the upper side of bracket, whereby the lower end of the bolt is stabilized, substantially as set forth.

In testimony whereof I have hereunto set my hand.

GEORGE F. BRENT.

Witnesses:
 F. B. LLOYD,
 FRANK D. RYAN.